United States Patent
Kepniss et al.

(10) Patent No.: US 6,413,649 B2
(45) Date of Patent: *Jul. 2, 2002

(54) SILVER-COPPER-NICKEL INFILTRATION BRAZING FILLER METAL AND COMPOSITES MADE THEREFROM

(75) Inventors: David J. Kepniss, Redwood City; Toshimasa Oyama, Palo Alto, both of CA (US)

(73) Assignee: The Morgan Crucible Company plc (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,146

(22) Filed: Mar. 6, 1998

(51) Int. Cl.[7] ............................... B22F 3/26; C22F 1/14
(52) U.S. Cl. ....................... 428/567; 148/678; 148/686; 228/262.1; 228/262.4; 420/469; 420/485; 420/490; 420/496; 420/497; 420/501; 420/502; 420/503; 420/505; 420/507; 420/508; 420/511; 420/512; 428/672; 428/673; 428/674; 428/676; 428/677; 428/941
(58) Field of Search .......................... 428/567, 672, 428/673, 674, 676, 677, 941; 420/511, 512, 507, 502, 505, 501, 497, 490, 485, 503, 508, 469, 496; 228/262.1, 262.4; 164/461, 475, 477; 148/678, 686, 528

(56) References Cited

U.S. PATENT DOCUMENTS

| | | | | |
|---|---|---|---|---|
| 2,274,863 A | * | 3/1942 | Leuser | 420/508 |
| 2,719,085 A | * | 9/1955 | Schatz | 420/502 |
| 2,953,844 A | * | 9/1960 | Gelb et al. | 420/502 |
| 3,411,900 A | * | 11/1968 | Roeder et al. | 420/503 |
| 3,658,997 A | * | 4/1972 | Sloboda et al. | 420/512 |
| 4,416,853 A | * | 11/1983 | Morikawa et al. | 420/469 |
| 4,554,218 A | * | 11/1985 | Gardner et al. | 428/567 |
| 4,810,308 A | * | 3/1989 | Eagar et al. | 148/678 |
| 4,919,730 A | | 4/1990 | Mizuhara | 148/24 |

FOREIGN PATENT DOCUMENTS

| | | | | |
|---|---|---|---|---|
| GB | 1001291 | * | 8/1965 | 420/502 |
| JP | 7-126079 A | * | 5/1995 | C04B/37/02 |
| JP | 11-163016 A | * | 6/1999 | C22C/5/02 |
| JP | 11-163016 | * | 6/1999 | |

OTHER PUBLICATIONS

Metals Handbook Ninth Edition; vol. 2 Properties and Selection: Nonferrous Alloys and Pure Metals; American Society For Metals; Metals Park, Ohio; Dec. 1979; pp. 675–677.*

* cited by examiner

Primary Examiner—Robert R. Koehler
(74) Attorney, Agent, or Firm—Bruce D. Gray; Dean W. Russell; Kilpatrick Stockton LLP

(57) ABSTRACT

The present invention is directed to brazing filler metals that can be used in the infiltration brazing of porous matrix materials without the need for a flux. The brazing filler metals contain two different Group II metals and a third metal of Group 9 and 10. A particular brazing filler metal of the invention contains silver, copper, and nickel. The invention is also directed to composite materials formed by infiltration of the brazing material into a porous matrix, and to methods for preparing the composite materials. The invention is further directed to composite articles fabricated from composite materials, including steel bearings or bushings, and to methods of preparing the composite articles.

35 Claims, 2 Drawing Sheets

SILVER-COPPER-NICKEL INFILTRATION BRAZING FILLER METAL AND COMPOSITES MADE THEREFROM

FIELD OF THE INVENTION

The invention relates to brazing filler metals and, in particular, to brazing filler metals for use in preparing composite materials, including metal composites. In a particular embodiment, the invention relates to a brazing filler metal containing silver, copper, nickel and, optionally, silicon. The brazing filler metals of the invention may be in the form of foil, wires, powders and pastes. The present invention also relates to composite materials made using the brazing filler metals, and to composite articles fabricated therefrom, including steel bearings or bushings, and to methods of preparing the composite materials and articles.

BACKGROUND OF THE INVENTION

Brazing is a method similar to welding for use in joining two or more materials, including metals, ceramics, or combinations thereof. Heat is applied to a brazing filler metal, which liquefies and flows by capillary action into the gap separating the materials. The brazing filler metal solidifies to create a bond at the molecular level thereby joining the materials.

Brazing can be used to join metals and ceramics in structural applications. The capillary flow of molten brazing filler metals can also be used to infiltrate or impregnate porous materials, including metals and ceramics. As a result, brazing technology can be used to prepare composite materials by providing a molten brazing filler metal to fill pores in matrix materials.

A variety of brazing filler metals are known in the art, including brazing filler metals based on precious and non-precious metals. Variables to be considered in selecting a particular brazing filler metal include cost, operating temperature of the brazement and wettability of the material to be joined by the brazing material. "Wettability" describes the ability of a solid surface to accept the flow and adherence of a liquid (i.e., the molten brazing filler metal). In general, a brazing filler metal typically wets at or near the liquidus temperature of the active metal component, typically greater than 450° C.

Brazing filler metals based on silver are commonly used to join metal or ceramic materials, as well as to infiltrate and coat porous metals or alloys. For example, brazing filler metals comprising silver, copper, and optionally zinc, are commonly used to join copper, steel, Kovar and nickel alloy components in a variety of industrial applications. American Welding Society, *Brazing Handbook* (4th ed. 1991).

Silver-based brazing filler metals are also used to infiltrate and coat powder metallurgy components having less than 93% theoretical density, including steel components. Steel powder metallurgy components can be fabricated to form a matrix having an interconnected porosity. The infiltration brazing filler metal is typically formed into a wire, wrapped around a flux coated component, and heated. The brazing filler metal infiltrates, coats and fills these pores, significantly increasing the density and hardness of the matrix component. Infiltrated matrix components, termed composite materials, are then fabricated into composite articles such as bearings or bushings. The improved surface of the infiltrated matrix component reduces wear on the bearing surface. Silver's high lubricity and resistance to galling make this metal particularly desirable for use in fabricating bearings, bushings, and similar load bearing parts.

An 85% silver–15% manganese alloy, in the form of coiled rings, is used to infiltrate and coat steel powder metallurgy components. As with many silver-based brazing filler metals, the 85% silver–15% manganese alloy requires the presence of a flux during furnace brazing in hydrogen environments. The flux forms a protective coating which prevents oxidation, removes oxides, and reduces fuming during the brazing process. Brazing flux may be made of fluoride, chloride, borax, boric acid or borates. Thus, when an 85% silver–15% manganese alloy is used to infiltrate and coat steel powder metallurgy components, a chloride flux is typically used to prevent formation of manganese oxides. Fluxing is undesirable because it adds to the cost and duration of the brazing process. Moreover, the infiltration of the flux itself into the pores can block braze infiltration, leading to a decrease in density, hardness and toughness of the metal composite.

The use of the 85% silver–15% manganese alloy presents several other disadvantages. First, the 85% silver–15% manganese alloy can only be hardened by strain-hardening by cold work. This results in an increase in hardness and strength, but a decrease in ductility. Moreover, increasing the strength of the brazement by cold working is both costly and infeasible. Second, the 85% silver–15% manganese alloy is both difficult and costly to manufacture. Specifically, alloys containing manganese tend to react with graphite molds. As a result, the ingots of these alloys can be difficult to remove and the lifetime of the mold is consequently reduced. Furthermore, alloys containing manganese must be treated chemically (i.e., by acid pickling) before fabrication into the wire form commonly used for infiltration brazing.

Elimination of the flux requirement for infiltration brazing is clearly desirable. One attempted solution to the need for a flux in the context of joining brazes has been to add small quantities of lithium to silver-copper alloys to create a "self-fluxing" material. These alloys are commercially available from Lucas-Milhaupt, Inc., a division of Handy & Harman Company, under the trade names Lithobraze 720 and Lithobraze 925. Lithium reacts quickly with oxygen to protect the other alloy constituents from oxidation. However, alloys containing reactive elements like lithium are expensive and difficult to prepare, as lithium is readily lost or oxidized during metallurgic processing.

It is therefore an object of the present invention to provide brazing filler metals which do not require a flux.

It is a further object of the present invention to provide fluxless infiltration brazing filler metals which exhibit enhanced infiltration and provide dense, tough composite materials.

It is another object of the present invention to provide infiltration brazing filler metals which are age-hardenable at relatively low temperatures.

It is also an objective of the present invention to provide infiltration brazing filler metals which are simple to manufacture and avoid the presence of manganese, lithium or other extremely reactive elements.

It is an additional object of the present invention to provide infiltration brazing filler metals which impart enhanced lubricity to composite articles.

SUMMARY OF THE INVENTION

These and other objects and advantages are provided by the present invention, which is directed to brazing filler metals and, in particular, to brazing filler metals for use in infiltrating porous materials, such as ceramics and porous metals (e.g., metals prepared by powder metallurgy).

The brazing filler metals of the present invention contain two different Group 11 metals and a Group 9 or 10 metal. The first Group 11 metal is typically present in an amount ranging from about 78 to about 99.97% by weight. The second Group 11 metal, which is different from the first metal, is typically present in an amount ranging from about 0.01 to about 12% by weight. The Group 9 or 10 metal is typically present in an amount ranging from about 0.01 to 5% by weight. The brazing filler metal may also contain silicon in an amount ranging from about 0.01 to about 5% by weight. All percentages are based on the total weight of the brazing filler metal. In a more specific embodiment, the invention is directed to brazing filler metals containing silver, copper, nickel, and optionally silicon.

The brazing materials of the present invention do not require a flux, are age-hardenable, exhibit satisfactory infiltration, and impart enhanced lubricity to composite materials and composite articles formed therefrom. The brazing filler metals may be in the form of foil, wires, powders or pastes.

The brazing filler metals of the present invention can be used to infiltrate porous metals, such as powder metallurgy components, and particularly to infiltrate steel powder metallurgy components that are subsequently fabricated into bearings or bushings. Accordingly, the present invention is also directed to composite materials that have a porous matrix phase, typically containing interconnected pores, and a dispersed phase of the brazing filler metal of the present invention, which fills these pores. The present invention is further directed to composite articles fabricated from such composite materials, including bearings, bushings and other load bearing parts.

The present invention is also directed to the process of using the brazing material to make age-hardenable composite articles, by disposing the brazing filler metal adjacent to a surface of the porous matrix material, heating the resulting combination for a time and at a temperature sufficient for the brazing filler metal to wet the porous matrix material and to coat the pores, age-hardening the composite material by heating for a time and at a temperature sufficient to solution-anneal the composite, quenching the solution-annealed material, and heating the quenched component for a time and at a temperature sufficient to cause hardness of the quenched component to increase.

The brazing filler metals of the present invention are capable of infiltrating the pores of the matrix without the need for a flux. Moreover, the brazing filler metals of the present invention exhibit improved infiltration resulting from the elimination of the flux. Avoiding the use of flux prevents clogging of the pores, which can sometimes prevent or complicate infiltration of a matrix component by the brazing filler metal. Thus, the brazing filler metals of the present invention more completely wet and infiltrate porous materials than known brazing filler metals. In addition, the brazing filler metals of the present invention can age-harden at moderate temperatures, avoiding the need for impractical strain-hardening by cold work. The brazing filler metals are easy to cast and do not react with graphite molds as do manganese-containing materials. Further, the brazing filler metals are easily drawn into wire without the pickling process typically required to draw manganese-containing wire. This avoidance of manganese also contributes to the ability of the brazing filler metals to function in the absence of a flux, since the flux is no longer required to limit manganese oxidation.

Composite materials made using the brazing filler metals of the present invention are dense, tough, hard, and have a high lubricity. These materials are very suitable for applications in bearings, bushing or other devices where friction between moving parts must be minimized. For instance, porous steel bearings or bushings impregnated with a brazing filler metal of the present invention have a longer lifetime and exhibit decreased galling relative to bearings made using infiltration brazing metals known in the art.

These objects and advantages, as well as the nature and proper use of the invention, will become apparent from the following description of the invention, and in the accompanying drawings, in which like referenced characters generally refer to the same parts or elements throughout the figures. The detailed description and the drawing figures are not to be interpreted as limiting the invention in any way.

DETAILED DESCRIPTION OF THE INVENTION

Figure 1:
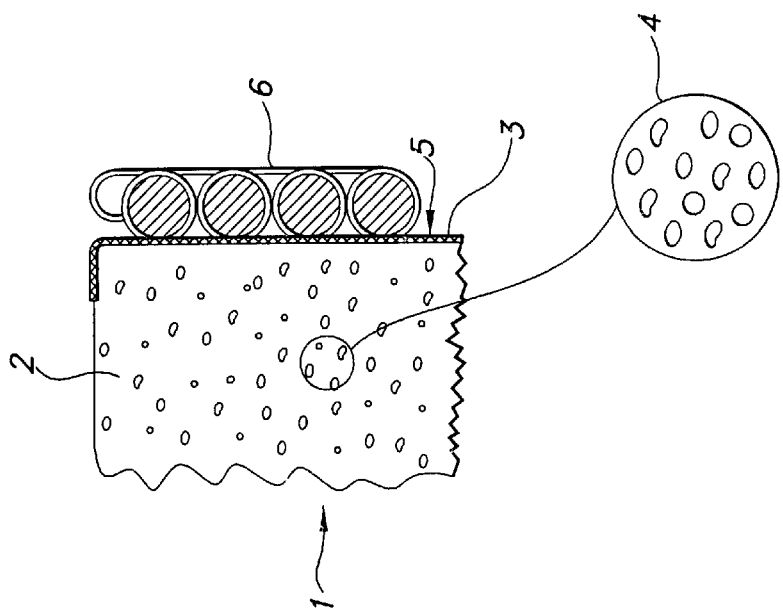
FIG. 1 is a schematic cross section of a brazing assembly for use with known infiltration brazing filler metals.

The brazing filler metals of the present invention contain two different Group 11 metals and a Group 9 or 10 metal. Group 11 metals are found in Group 11 of the Periodic Table, and generally include copper, silver, and gold. Group 10 metals are those found in Group 10 of the Periodic Table, and include nickel, palladium, and platinum. Group 9 metal are those found in Group 9 of the periodic table, and include cobalt, rhodium, and iridium. The brazing filler metals may be in the form of foil, wires, powders or pastes, for example.

The brazing filler metals of the present invention can be prepared by simply mixing the appropriate amount of the Group 11 and 9 or 10 metals (e.g., in the form of metal powders). This mixture can be pressed into a desired shape, mixed with a liquid vehicle to form a viscous slurry or paste, or heated until molten and cast into molds to form ingots of alloy. The result, after casting and cooling, is a homogenous solid solution of the three or four components of the brazing filler metal. This material is generally resistant to oxidation, and requires no special storage conditions. The alloy may be formed into ingots and then made into various forms, such as wires, ribbons, preforms, foils, sheets, and tapes, for ease of transport and use.

Powders of the present invention can be formed by mixing metal powders, as described above. Alternatively, powders can be formed by attrition from an alloyed source, or from a mix of the two forms of powders. Powders can also be produced by melting the desired constituents together, and atomizing the liquid to form droplets of alloy prior to solidification. Pastes can be formed from powders by mixing with a carrier liquid, such as the 3% solution of hydroxylpropylcellulose and 97% 1,2 propanediol disclosed in U.S. Pat. No. 4,919,730.

In particular, the brazing filler metals of the present invention may contain silver, copper, nickel, and, optionally, silicon. In weight percent, the brazing filler metals comprise 78–99.97% silver, 0.01–12% copper, 0.01–5% nickel and, optionally, 0.01–5.0% silicon.

It has been found that the brazing filler metals of the present invention eliminate the need for a highly reactive element, like lithium, while retaining the ability to infiltrate porous materials without the use of a flux. While not wishing to be bound by any particular theory, it is believed that silver and copper are sufficiently noble that they do not require the presence of a flux. The elements nickel and silicon are sufficiently reactive to remove and protect the brazing assembly from oxidation under a controlled atmosphere. Both of these elements behave like lithium, but to a much lesser degree, and are therefore effective in environments than contain less oxygen that ambient air.

By eliminating the flux, the cost and time associated with the infiltration brazing process is significantly reduced, and infiltration of the brazing filler metal into the porous matrix is significantly enhanced.

It has also been found that the brazing filler metals of the present invention can be age-hardened, either on its own or as a component of a composite material. To the applicant's knowledge, there are no age-hardenable braze filler metals on the market. The copper component of the braze filler metal creates the age-hardening effect, with the amount of copper directly proportional to age-hardenability. Nickel and silicon make less of a contribution to age-hardening, as the solid solubilities of these elements in silver is much less than the solid solubility of copper.

Age-hardening is typically accomplished by solution annealing the braze filler metal or composite material at 700–800° C., quenching in water, and then heating to a temperature between 250 and 500° C. The age-hardened braze filler metal consists of a silver-rich matrix with some dissolved and some precipitated copper, as well as solidified nickel and silicon. As a result of age-hardening, the brazing filler metals of the present invention are tougher, harder and possess an increased lifetime relative to other silver infiltration brazing filler metals or other non-age hardening brazing filler metals known in the art.

It further believed that the increased content of Group 11 metal, particularly of silver, of the present invention provides enhanced lubricity relative to other known silver infiltration brazes.

FIG. 1 shows an example of a brazing assembly necessary for use with known infiltration brazing filler metals. The braze assembly 1 comprises a matrix component 2 having a surface 3 and a plurality of pores 4, which may be interconnected. A coating of flux 5 is applied to the surface 3. Brazing filler metal 6 is disposed adjacent to the flux coating 5. A typical brazing filler metal is an 85% silver–15% manganese alloy in the form of a wire coil.

Figure 2:
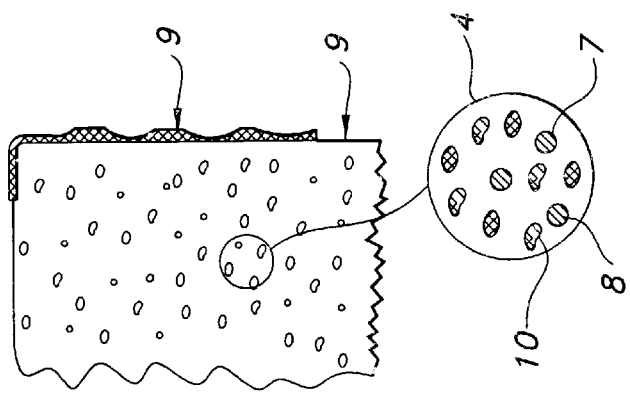
FIG. 2 is a schematic cross section of a composite article formed using known infiltration brazing filler metals.

FIG. 2 shows an example of a matrix component that has been brazed using a flux (i.e., a composite material prepared by heating the braze assembly of FIG. 1). Some of the pores 4 are filled with a layer of flux 7, while others contain a layer of molten brazing filler metal 8. Some pores 4 contain both flux and brazing filler metal 10. The surface 3 is coated with a residue 9 comprising flux and molten brazing filler metal. As is apparent from the figure, the flux can prevent the brazing filler metal from fully permeating the pores of the matrix component.

Figure 3:
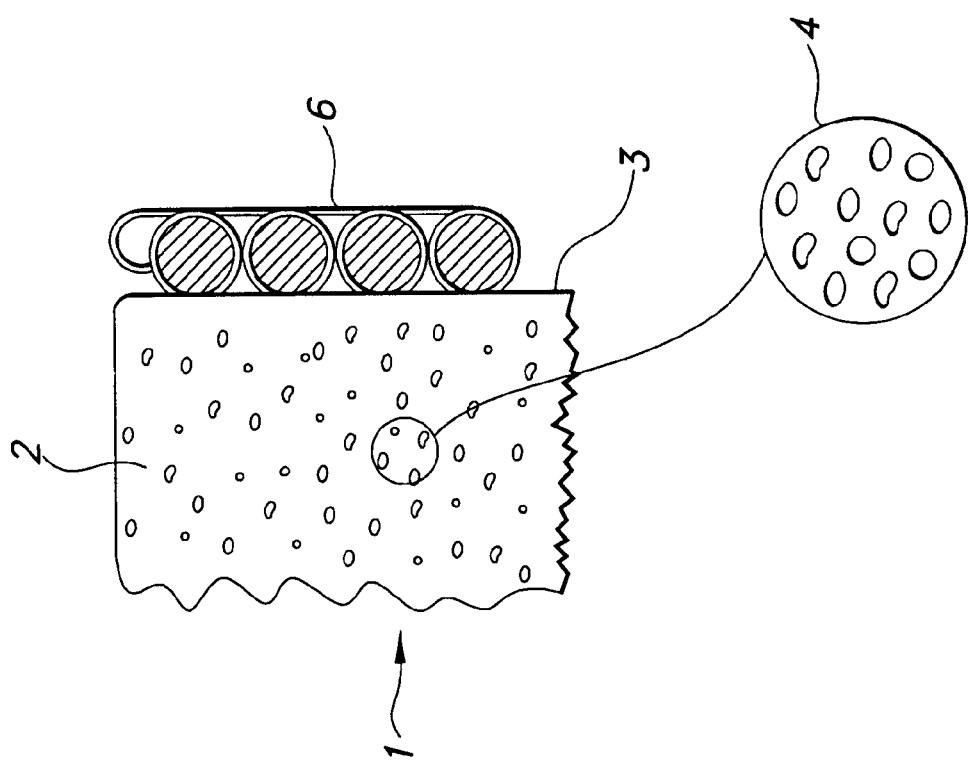
FIG. 3 is a schematic cross section of the brazing assembly for use in accordance with the brazing filler metals of the present invention.

FIG. 3 shows an example of a brazing assembly using a brazing filler metal of the present invention. The brazing assembly 1 comprises a matrix component 2 having a surface 3 and a plurality of pores 4. This porous matrix may be, for example, a porous metal formed using powder metallurgy techniques. As used herein, "powder metallurgy" refers to techniques known in the art for forming metal articles by mixing, compacting, sintering or otherwise consolidating metal powders. A variety of steels can be formed by powder metallurgy, including carbon steels, high strength low alloy steels, tool steels, and high speed steels. One example of a powder metallurgy component is a AISI Type 4600 low alloy steel article having a destiny less than 93% of theoretical. Brazing filler metal 6 is disposed adjacent to the surface 3 of the porous matrix component 2.

Specific compositions of brazing filler metal according to the present invention that are particularly suitable as infiltration brazes have compositions having about 78 to about 99.97 % by weight, more particularly about 90 to about 97% by weight, of the first metal, more particularly silver; about 0.01 to about 12% by weight, more particularly about 4 to about 10% by weight, even more particularly, about 5 to about 8% by weight of the second metal, more particularly copper; about 0.01 to about 5% by weight, even more particularly, about 0.25 to about 0.75% by weight of the third metal, more particularly nickel; and about 0 to about 5% by weight, more particularly about 0.01 to about 2% by weight, even more particularly, about 0.1 to about 0.25% by weight silicon, all based on the total weight of the brazing filler metal.

As indicated above, the brazing filler metals of the present invention may comprise a variety of forms, including foil, wires, powders and pastes. In a particular embodiment of the present invention, the brazing filler metal is formed into a wire coil.

Figure 4:
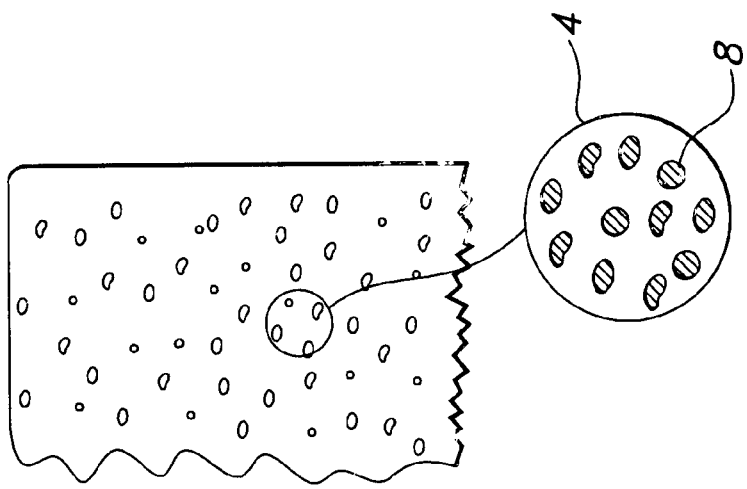
FIG. 4 is a schematic cross section of a composite article in accordance with the present invention.

In accordance with the present invention, FIG. 4 shows a composite material formed from the brazing assembly of FIG. 3. The pores 4 are filled with brazing filler metal rather than with flux, which was absent from the brazing process. The brazed component or composite material can then be made into a composite article, such as bearing, bushing or other device using standard machining practices.

In accordance with the method of the present invention, a porous matrix component is brazed by first disposing the brazing filler metal adjacent to the surface of the matrix component to form a brazing assembly. The porous matrix component may be a metal manufactured using powder metallurgy techniques, or may be some other porous material, such as a porous ceramic material. For example, the brazing filler metal of the present invention is particularly suitable for use where the porous metal component is steel manufactured by powder metallurgy techniques, for instance steel having a density less than 93% of theoretical density. The brazing filler metal can be prepared in the form of a wire coil that can be wrapped around the porous matrix component.

The brazing assembly is heated to melt the brazing filler metal, which infiltrates, coats and fills the pores to form a composite material. The brazing assembly is preferably heated in a wet hydrogen environment in a retort furnace. Preferably, the composite material is heated at a rate to uniformly warm both the porous matrix and the brazing filler metal. The brazing temperature is reached to cause uniform flow of the brazing filler metal. Cooling occurs at a rate to prevent distortion. Specifically, a typical braze cycle has a furnace ramp-up rate of 2° C. per minute to about 15° C. per minute, and more specifically, 10° C. per minute. The brazing range is between 930° C. and 1000° C., with a target temperature of about 950° C. to about 975° C. The typical ramp-down rate is 2° C. per minute to the maximum furnace capability, and more particularly, 15° C. per minute.

The composite material is then age-hardened by heating, quenching and reheating. Preferably, the composite material is heated for one hour at 760° to solution anneal, quenched in ambient tap water, and then heated for thirty minutes at 260° C. Alternatively, the composite material is quenched in a water solution, oil or a synthetic quenchant.

The examples which follow illustrate the silver-copper-nickel brazing filler metals of the present invention. The examples are for illustrative purposes only and are not meant to limit the scope of the claims in any way.

EXAMPLE 1

In this example, the brazing filler metal ("Alloy A") consisted of, in weight percent, 91.5% silver, 8% copper, and 0.5% nickel. All constituents of the brazing filler metal were of standard commercial purity of at least 99% purity. Melting was conducted for each example in an alumina crucible with induction heating. The material was cast under a vacuum into a bar, from which three bars were then cut. The first bar was reserved for wire ingot, the second for age-hardening experiments, and the third for a foil rolling and wettability test.

(1) Wettability: Two sintered steel slugs were used for the wetting test. Slugs were prepared by powder metallurgy techniques. One round slug was quartered to make furnace coupons. A small foil square (approximately 0.007×0.5×0.5 inch) was cut and placed onto the steel slug coupon. The first melt test was run in a vacuum of $10^{-5}$ Torr from 10° C./minute to 950° C., holding 15 minutes. The second melt test was run under the same conditions but from 15° C. to 500° C. The square of foil material disappeared, leaving a silver shadow on the sintered slug surface. As the alloy will not vaporize under these conditions, the applicants concluded that the brazing filler metal infiltrated the internal pores. The composite material was not cross-sectioned to determine the extent of filtration.

(2) Age-Hardenability: Twelve test blocks were cut from the second bar. The blocks were ground with silicon carbide paper to a 600 grit finish to remove surface oxides. "As cast" hardness was recorded as 42 Rockwell 30T, as shown in Table I. Each alloy piece was solution annealed at 760° C. for one hour in air, quenched in ambient tape water and polished. Age-hardening was evaluated under varying time and temperature conditions as shown in Table II. Specifically, age-hardening of Alloy A was measured at 260, 500 and 550° C., at 0, 0.5, 1, 3 and 10 hours, respectively. Peak hardness was achieved after holding at 0.5 hours at 260° C. (Rockwell 15T).

(3) Infiltration: Portions of the first bar of Alloy A were remelted and cast into quarter inch wire ingots. Each ingot was swagged, then cold rolled, and finally drawn 0.062 inch diameter wire. The wire was then formed into a coil having an inner diameter of 2.250 inches and a mass of 33.8 grams. The various coils were tested under production conditions and evaluated for performance.

EXAMPLE 2

In this example, the brazing filler metal ("Alloy B") consisted of, in weight percent, 94.5 % silver, 5% copper, and 0.5% nickel. The material was cast into bars as described in Example 1.

(1) Wettability: Melt tests were performed as described in Example 1. Alloy B wetted the surface at 950° C. and infiltrated at 975° C.

(2) Age-Hardenability: "As cast" hardness was 18 Rockwell 3T, as shown in Table I. Age-hardening was evaluated as described in Example 1. Results are shown in Table II. Overall, Alloy B did not age-harden as well as Alloy A.

(3) Infiltration: Infiltration testing was conducted as described in Example 1.

EXAMPLE 3

In this example, the brazing filler metal ("Alloy C") consisted of, in weight percent, 91.85% silver, 7.5% copper, 0.5 % nickel, and 0.15% silicon. The material was cast into bars as described in Example 1.

(1) Wettability: Melts tests were performed as described in Example 1. Alloy C not only wetted the steel surface, but also infiltrated.

(2) Age-Hardenability: "As cast" hardness was 28.5 in Rockwell 30T, as shown in Table I. Age-hardening experiments were conducted as described in Example 1. In general, Alloy C did not age harden as well as A or B, with only some exceptions relative to Alloy B at 260° C. after 1 and 3 hours. Results are shown in Table II.

(c) Infiltration: Infiltration testing was conducted as described in Example 1.

TABLE I

As Cost hardness in Rockwell 30T
As Cost Hardness
Rockwell 30T

| | |
|---|---|
| Alloy "A" | 42 |
| Alloy "B" | 18 |
| Alloy "C" | 28.5 |

TABLE II

Age Hardening Response
Solution Annealed at 760° C. and Quenched

| 260° C. | 0 | 0.5 | 1 | 3 | 10 |
|---|---|---|---|---|---|
| Alloy "A" | 64 | | 82.6 | 81.4 | 79.3 |
| Alloy "B" | 57 | | 76.3 | 75 | 78.5 |
| Alloy "C" | 57 | | 80 | 81 | 77 |
| 500° C. | | | | | |
| Alloy "A" | 64 | 77 | 76 | 75.4 | 74 |
| Alloy "B" | 57 | 74.3 | 72.6 | 71.3 | 72 |
| Alloy "C" | 57 | 74 | 72.2 | 70.3 | 71 |
| 550° C. | | | | | |
| Alloy "A" | 64 | 78.4 | 73.2 | 71 | 68.5 |
| Alloy "B" | 57 | 74.5 | 75.1 | 70.6 | 64.2 |
| Alloy "C" | 57 | 73.8 | 67.4 | 66.2 | 63.4 |

While various embodiments of the invention have been described above detail, various changes and modifications thereof may be made without departing from the spirit and scope of the invention. As such, these changes and modifications are properly, equitably, and intended to be, within the full range of equivalents of the following claims.

What is claimed is:

1. A brazing filler metal consisting essentially of silver in an amount based on the total brazing filler metal composition ranging from about 78 wt % to about 99.97 wt %, a second metal selected from the group consisting of Group 11 metals different from silver, a third metal selected from the group consisting of Group 9 and 10 metals excluding palladium.

2. The brazing filler metal of claim 1, wherein the second metal is present in an amount from about 0.01 to about 12% by weight, based on the total weight of the brazing filler metal.

3. The brazing filler metal of claim 1, wherein the third metal is present in an amount from about 0.01 to about 5% by weight, based on the total weight of the brazing filler metal.

4. The brazing filler metal according to claim 1, wherein the second metal is copper.

5. The brazing filler metal according to claim 4, wherein the third metal is nickel.

6. The brazing filler metal according to claim 1, wherein the second metal is copper in an amount of about 0.01 to about 12% by weight, and the third metal is nickel in an amount of about 0.01 to about 5% by weight, all based on the total weight of the brazing filler metal.

7. The brazing filler metal of claim 6, containing, in weight percent: 91.5% silver, 8% copper, and 0.5% nickel.

8. The brazing filler metal of claim 6, containing, in weight percent: 94.5% silver, 5% copper, and 0.5% nickel.

9. The brazing filler metal of claim 1, wherein the brazing filler metal is in a form selected from the group consisting of powders, pastes, preforms, tape, foils, ribbons, sheets and wires.

10. The brazing filler metal of claim 1, which is an alloy of the first, second, and third metals.

11. The brazing filler metal of claim 1, which is a mixture of powders of the first, second, and third metals.

12. A brazing filler metal consisting essentially of silver in an amount ranging from about 78 wt % to about 99.97 wt %, copper in an amount ranging from about 0.01 to about 12 wt %, nickel in an amount ranging from about 0.01 to about 5 wt %, and from about 0.01 to about 5% by weight silicon, all based on the total weight of the brazing filler metal.

13. The brazing filler metal of claim 12, containing, in weight percent: 91.85% silver, 7.5% copper, 0.5% nickel, and 0.15% silicon.

14. A composite material comprising:
(a) a matrix component having a plurality of pores; and
(b) a brazing filler metal disposed within the pores, comprising a first metal selected from the group consisting of Group 11 metals, a second metal selected from the group consisting of Group 11 metals different from said first metal, and a third metal selected from the group consisting of Group 9 and 10 metals.

15. The composite material of claim 14, wherein the matrix component comprises a metal or alloy.

16. The composite material of claim 15, wherein the matrix component is a porous metal manufactured using powder metallurgy.

17. The composite material of claim 16, wherein the matrix component comprises steel having a density less than 93% of theoretical and contains interconnected pores.

18. A method of preparing a composite material comprising:
(a) a matrix component having a plurality of pores; and
(b) a brazing filler metal disposed within the pores, comprising a first metal selected from the group consisting of Group 11 metals, a second metal selected from the group consisting of Group 11 metals different from said first metal, and a third metal selected from the group consisting of Group 9 and 10 metals, wherein the method comprises:
(a) disposing a brazing filler metal adjacent to a porous matrix component, said brazing material comprising a first metal selected from the group consisting of Group 11 metals, a second metal selected from the group consisting of Group 11 metals different from said first metal, and a third metal selected form the group consisting of Group 9 and 10 metals, thereby forming a brazing assembly;
(b) heating the brazing assembly for a time and at a temperature sufficient to cause the brazing filler metal to melt and infiltrate the pores to form a composite material; and
(c) age-hardening the composite material by heating the composite material for a time and at a temperature sufficient to solution anneal the composite material, quenching the solution annealed composite, and heating the quenched composite material for a time and at a temperature sufficient to cause hardness of the quenched composite material to increase.

19. The method of claim 18, wherein the porous matrix component is a metal or alloy.

20. The method of claims 19, wherein the porous matrix component is manufactured using powder metallurgy.

21. The method of claim 20, wherein the porous matrix component comprises steel having a density less than 93% of theoretical.

22. The method of claim 18, wherein the brazing filler metal comprises, in weight percent, 78–99.97% silver, 0.01–12% copper, 0.01–5% nickel, and 0.01–5.0% silicon.

23. The method of claim 18, wherein the brazing filler metal is in a form selected from the group consisting of powders, pastes, preforms, solidified foils, ribbons, sheets and wires.

24. The method of claim 18, wherein heating (b) comprises heating the brazing filler metal for about one hour at a temperature of about 760° C.

25. The method of claim 18, wherein age-hardening (c) comprises heating the quenched composite material for about thirty minutes at a temperature of about 260° C.

26. The method of claim 18, wherein the brazing assembly is free of flux.

27. The method of claim 18, further comprising (d) fabricating a composite article from the composite material using standard machining techniques.

28. The method of claim 27, wherein the composite article is a bearing.

29. The method of claim 27, wherein the composite article is a bushing.

30. A brazing filler metal consisting essentially of silver in an amount based on the total brazing filler metal composition ranging from about 78 wt % to about 99.97 wt %, a second metal selected from the group consisting of Group 11 metals different from silver, and a third metal selected from the group consisting of Group 9 and 10 metals, with the proviso that only a single Group 10 metal may be present in the composition.

31. A brazing filler metal consisting essentially of silver in an amount based on the total brazing filler metal composition ranging from about 78 wt % to about 99.97 wt %, a second metal selected from the group consisting of Group 11 metals different from silver, and a third metal selected from the group consisting of Group 9 and 10 metals, and silicon.

32. A brazing filler metal comprising silver in an amount based on the total brazing filler metal composition ranging from about 78 wt % to about 99.97 wt %, a second metal selected from the group consisting of Group 11 metals different from silver in an amount ranging from about 4 wt % to about 12 wt % based on the total brazing filler metal composition, a third metal selected from the group consisting of Group 9 and 10 metals, and silicon.

33. A brazing filler metal comprising gold in an amount based on the total brazing filler metal composition ranging from about 90 wt % to about 99.97 wt %, a second metal selected from the group consisting of Group 11 metals different from gold, and a third metal selected from the group consisting of Group 9 and 10 metals.

34. A brazing filler metal comprising gold in an amount based on the total brazing filler metal composition ranging from about 78 wt % to about 99.97 wt %, a second metal selected from the group consisting of Group 11 metals different from gold, a third metal selected from the group consisting of Group 9 and 10 metals, excluding palladium, and silicon.

35. A brazing filler metal comprising copper in an amount based on the total brazing filler metal composition ranging from about 90 wt % to about 99.97 wt %, a second metal selected from the group consisting of Group 11 metals different from copper, a third metal selected from the group consisting of Group 9 and 10 metals, and optionally 0.01 to 2 wt % silicon.

* * * * *